United States Patent
Delobel et al.

(10) Patent No.: US 7,055,542 B2
(45) Date of Patent: Jun. 6, 2006

(54) VALVE WITH INTEGRATED ACTUATOR

(75) Inventors: Pierre Delobel, Angleur (BE); Yves Defloo, Angleur (BE); Thomas Servais, Louvain-la-Neuve (BE)

(73) Assignee: Techspace Aero, S.A., Milmort (BE)

( * ) Notice: Subject to any disclaimer, the term of this patent is extended or adjusted under 35 U.S.C. 154(b) by 0 days.

(21) Appl. No.: 10/739,958

(22) Filed: Dec. 17, 2003

(65) Prior Publication Data

US 2004/0129310 A1    Jul. 8, 2004

(30) Foreign Application Priority Data

Dec. 19, 2002  (EP) ................... 02447261

(51) Int. Cl.
*F16K 1/12* (2006.01)
(52) U.S. Cl. ..................................... 137/219
(58) Field of Classification Search ................. 137/219
See application file for complete search history.

(56) References Cited

U.S. PATENT DOCUMENTS 3,493,008 A * 2/1970 Scaglione .................. 137/219
3,556,128 A * 1/1971 Scaglione .................. 137/219
3,637,187 A   1/1972 Burger ..................... 251/61.3
3,784,156 A * 1/1974 Paetzel et al. ............. 137/219
4,117,859 A * 10/1978 Illy .......................... 137/219
6,213,144 B1 * 4/2001 Moore ...................... 137/219

FOREIGN PATENT DOCUMENTS

| CH | 373935 | 12/1963 |
| DE | 2553163 A1 | 11/1975 |
| DE | 3800807 A1 | 8/1989 |
| DE | 19825574 A1 | 12/1999 |
| EP | 0750148 A1 | 11/1995 |
| EP | 0786534 A1 | 1/1997 |
| FR | 2675237 A1 | 4/1991 |

* cited by examiner

*Primary Examiner*—John Fox
(74) *Attorney, Agent, or Firm*—Knobbe Martens Olson & Bear LLP

(57) ABSTRACT

This invention relates to a flap valve with a shutter and a pneumatic actuator that is integrated into the valve, said actuator comprising a metal bellow interdependent with the shutter, wherein said bellow is directly welded onto an intermediate flange downstream from the valve and directly onto the shutter at the level of an end part upstream from the valve. The invention also relates to the use of such a valve as an isolating stop valve in the aerospace sector, preferably at high or cryogenic temperatures.

12 Claims, 3 Drawing Sheets

VALVE WITH INTEGRATED ACTUATOR

CROSS REFERENCE TO RELATED APPLICATIONS

This application claims priority under 35 U.S.C. § 119 to European Patent Application No. 02447261.5, filed on Dec. 19, 2002.

FIELD OF THE INVENTION

This invention relates to a flap valve with a pneumatic actuator that is integrated in the outflow of the fluid.

The application area of the invention is that requiring valves with high reliability and perfect tightness in very strict pressure and temperature conditions. In particular, the invention is related to isolating stop valves between tanks of liquid fuels (propellants: liquid hydrogen and oxygen) and engines in the aerospace sector. The operating temperatures of such valves are generally very low.

STATE OF THE ART

The existing valves are often provided with pneumatic actuators whose tightness is ensured by joints. In applications where leaks are critical, it is necessary to provide the valve with a double-barrier system with a duct for collecting and evacuating the leaks from the joints, located at the level of the cavity formed between them.

Several assemblies are also produced with one or two bellows to achieve the tightness. The bellow forms a cavity that is isolated from the fluid circulating in the outflow duct. The flap is opened by the injection of a control fluid into this cavity (e.g. helium).

In the existing assemblies, the bellow works by means of a part that is welded or screwed onto a shaft, which itself actuates the shutter.

Such valves are complicated in design and assembly, the different parts having to meet strict tolerances, which does not satisfy current concerns of simplification and cost reduction in space equipment.

Aims of the Invention

The present invention aims to provide a flap valve and integrated pneumatic actuator that do not present the drawbacks of the state of the art.

In particular, the invention aims to simplify the production and assembly of this type of valve.

The invention also aims to reduce the number of components relative to the solutions provided by the state of the art.

Main Characteristic Elements of the Invention

The present invention relates to a flap valve with a shutter and a pneumatic actuator that is integrated into the valve, said actuator comprising a metal bellow interdependent with the shutter, wherein said bellow is directly welded onto an intermediate flange, downstream from the valve and directly onto the shutter at the level of an end part, upstream from the valve.

According to the invention, the intermediate flange is an added part connecting two valve bodies.

Still according to the invention, the intermediate flange comprises a device for allowing the control fluid to pass into the actuator.

The end part advantageously co-operates with the intermediate flange and the bellow in order to create a chamber intended for the circulation of the control fluid under pressure that is perfectly tight relative to the outflow duct of the valve.

According to the invention, the chamber to be pressurised may be inside or outside the bellow.

A further advantage is that a release spring ensures the connection between the end part and the part of the shutter in contact with the seat.

According to a preferred embodiment, said metal bellow is a multi-walled bellow obtained by hydroforming.

The valve of the invention is more specifically intended to be used as an isolating stop valve in the aerospace sector, preferably at high or cryogenic temperatures.

SHORT DESCRIPTION OF THE FIGURES

DESCRIPTION OF AN EMBODIMENT ACCORDING TO THE STATE OF THE ART

Figure 1:
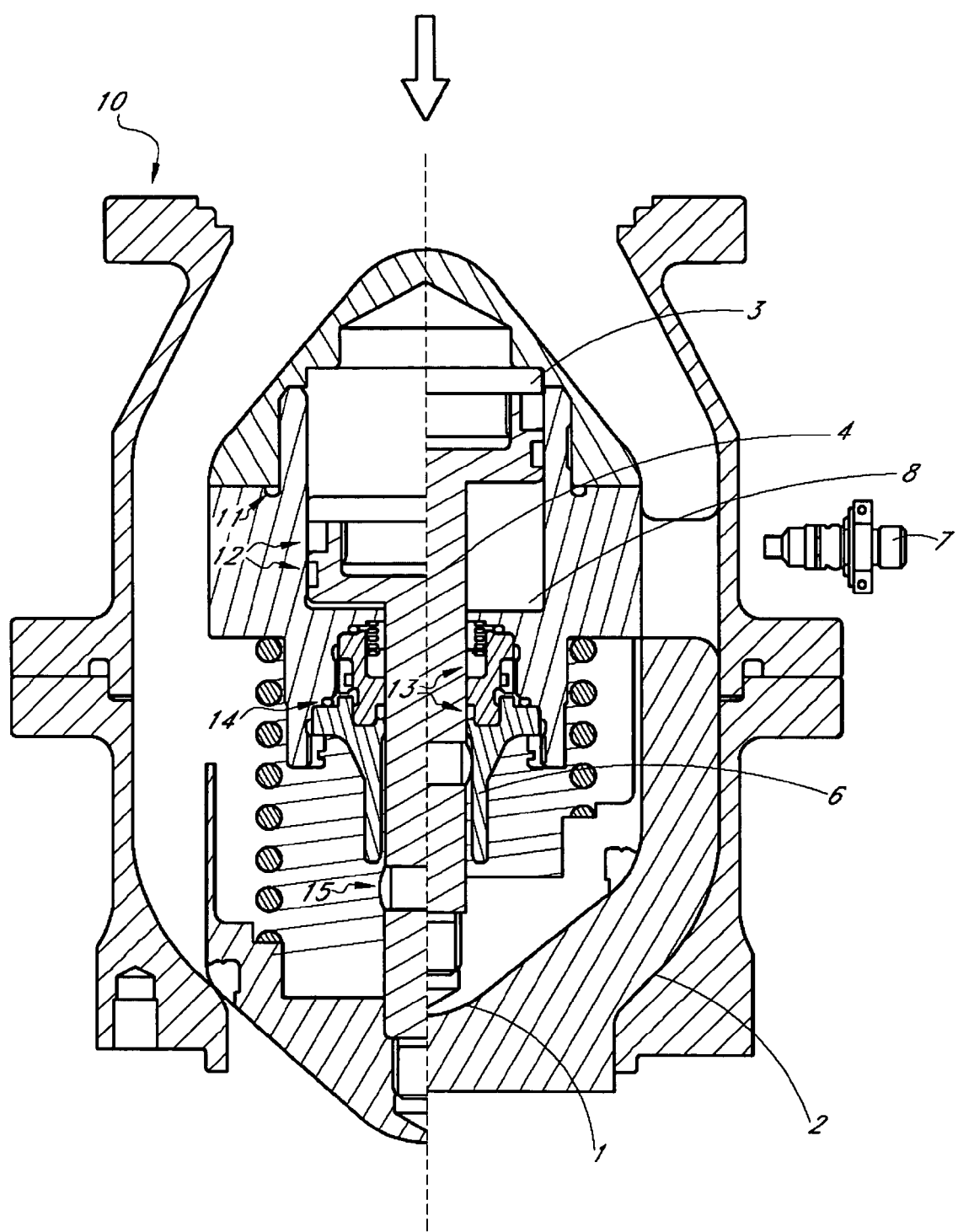
FIG. 1 shows a view in section of a flap valve with an integrated pneumatic actuator according to the state of the art.

FIG. 1 shows a flap valve 10 with integrated actuator according to the state of the art. The flap or shutter 1 is interdependent with a piston 3 that can slide in a chamber 8. Initially, the isolating stop valve 10 is in the closed position, the flap 1 resting on the seat 2. When the control fluid is injected into the chamber 8 by means of the intake device 7, the piston 3 moves and the flap 2 opens.

This device provides:
  one or several joints allowing to ensure the tightness of the actuator (for instance joint 11);
  one or several joints allowing to ensure the tightness of the piston (for instance joints 12).

In addition, this device generally requires a connecting shaft 4 between the piston 3 and the flap 2, said shaft also being provided with its own tightness at the level of a ring 6 in which it slides (for instance, joints 13, 14 and 15).

All these joints are traditionally lip joints, joints of the O-ring type, etc., polymer joints or joints having any other characteristics well known to those skilled in the art.

Since this design does not allow perfect tightness, it is necessary in the intended applications to provide a device for collecting leaks comprising a collection circuit made up of a cavity and an outflow duct for these leaks.

In addition, the intake device for the control fluid requires the complicated machining of an arm in the body of the valve.

DESCRIPTION OF A PREFERRED EMBODIMENT OF THE INVENTION

Figure 2:
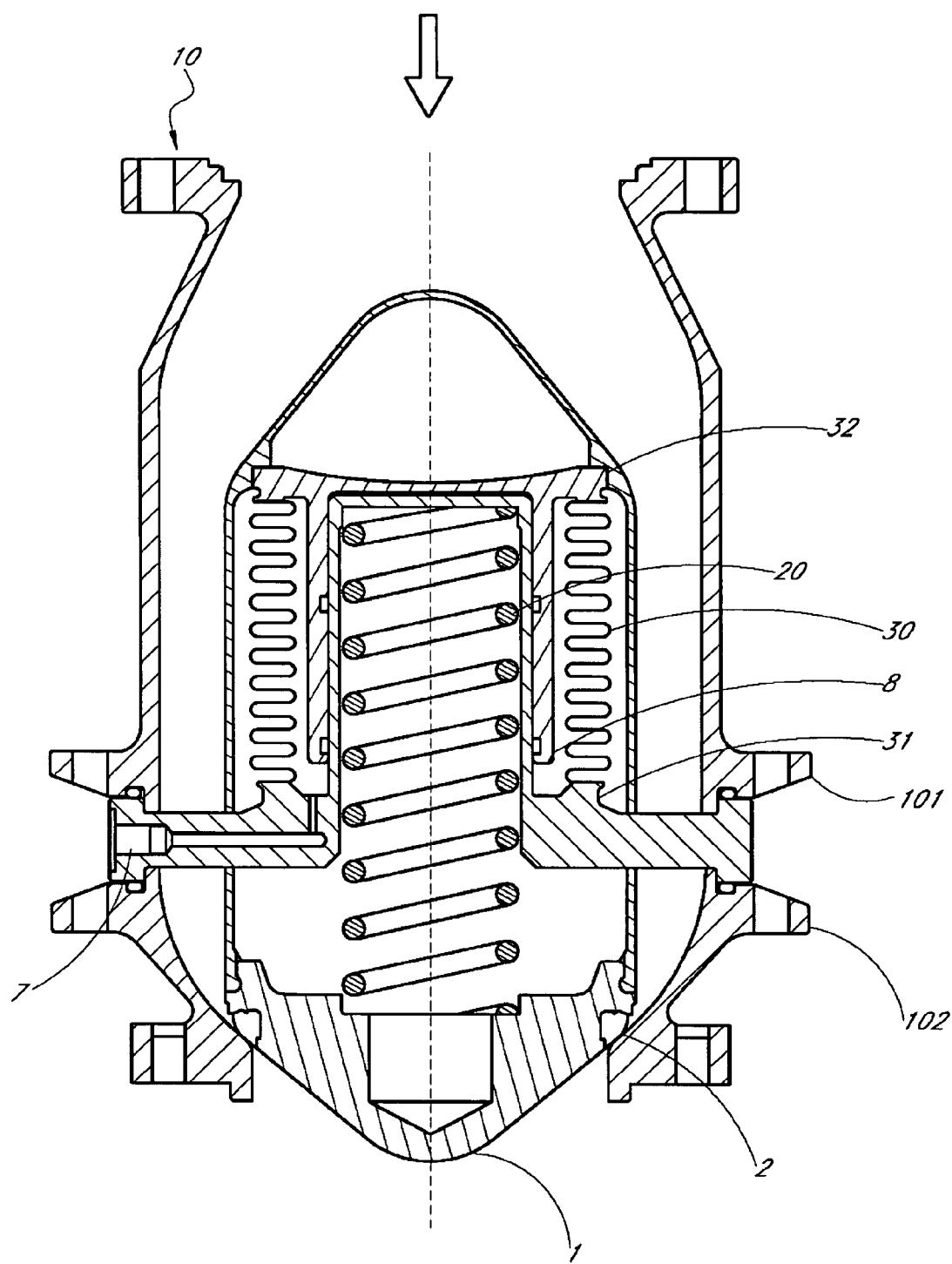
FIG. 2 shows a view in section of a flap valve with an integrated pneumatic actuator according to a first embodiment of the invention.

The invention as shown in FIG. 2 proposes a solution with bellow 30 in direct connection with the flap 1 of the valve 10. This device is therefore without an additional connecting shaft such as described in the state of the art, as well as without the tightness associated to it.

The bellow 30 is welded both to an intermediate flange 31 and to an end part 32. The bellow 30 is integrated inside the flap 1 of the valve 10. One end of the bellow thus leans against the body of the valve through a flange 31 that is mounted between the upstream part and the downstream part of the valve 10. The other end directly leans on the flap to be actuated at the level of said end part 32.

When one wishes to open the initially closed isolating stop valve, the inside of the bellow is pressurised through the intermediate flange 31 by means of an appropriate device 7. This results in a force which withdraws the flap 1 from its seat 2 by counteracting the restoring force of the coaxial spring 20.

The presence of an intermediate flange added between two parts of the valve body (101, 102) and containing the intake device for the control fluid precisely allows to avoid the machining of an arm in the valve body.

The standard specifications of the shutter (25–30 mm) are compatible with the existing bellows.

In the context of the invention, a welded multi-walled metal bellow obtained by hydroforming will advantageously be used.

The innovative feature proposed is that one end of the actuator directly acts on the shutter without any intermediate part. The other end leans on an intermediate flange located between the housings upstream and downstream the valve.

Figure 3:
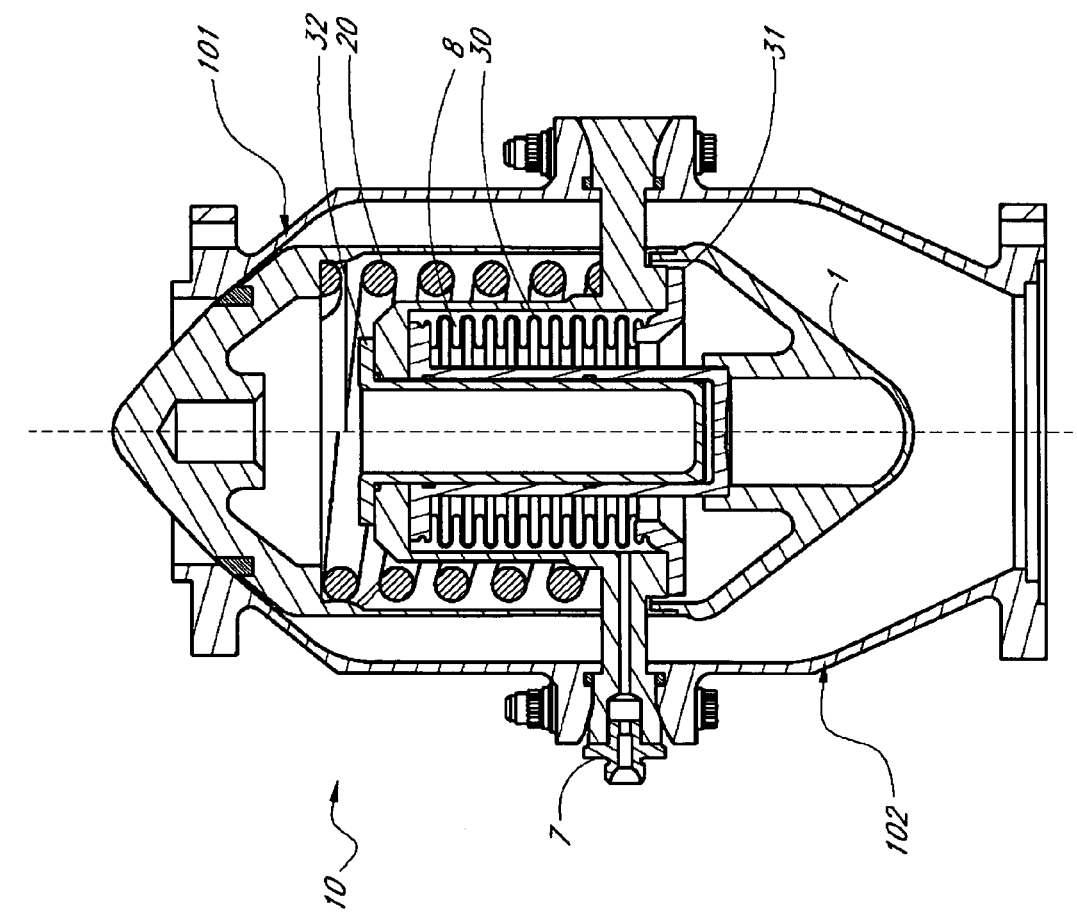
FIG. 3 shows a view in section of a flap valve with an integrated pneumatic actuator according to a second embodiment of the invention.

FIG. 3 shows an alternative embodiment of the invention wherein the bellow 30 is pressurised from the outside. This embodiment results in the better use of the characteristics of the bellow.

The invention allows to obtain the following advantages:
this solution allows to reduce the number of operations for producing the valve, especially in milling, to avoid having several parts and hence to simplify the assembly of the valve;
the bellow ensures a perfect tightness as regards the isolation of the control fluid circulating in the valve;
reliability is increased through the use of well-manufactured bellows; the use of a polymer joint always leads to leaks and difficult implementation, especially at extreme temperatures (cryogenic or high);
if the characteristics of the bellow allow it, it can ensure the spring function unaided in order to reclose the flap in the absence of control pressure.

What is claimed is:

1. A flap valve with a shutter and a pneumatic actuator that is integrated into the valve, said actuator comprising a metal bellow directly welded first onto an intermediate flange connecting two valve bodies and secondly onto an end part of the shutter, wherein said valve comprises guide means located inside the shutter and inside the bellow.

2. The valve of claim 1, wherein the intermediate flange comprises a device for allowing the control fluid to pass into the actuator.

3. The valve of claim 1, wherein the end part co-operates with the intermediate flange and the bellow in order to create a chamber intended for the circulation of the control fluid under pressure that is perfectly tight relative to the outflow duct of the valve.

4. The valve of claim 3, wherein the chamber to be pressurized is inside the bellow.

5. The valve of claim 1, further comprising a release spring configured to ensure a connection between the portion of the shutter in contact with the seat and the intermediate flange, so as to maintain the valve closed when the chamber is not pressurized.

6. The valve of claim 1, wherein said metal bellow is a multi-walled bellow obtained by hydroforming.

7. The valve of claim 1, wherein said end part of the shutter is axially located on the other side of the shutter part contacting a valve seat relative to said intermediate flange.

8. The valve of claim 1, wherein said guide means comprise a cylindrical guide surface of the intermediate flange co-operating slidingly with a coaxial cylindrical surface of said end part.

9. The valve of claim 8, wherein the axis of the two cylindrical surfaces is the axis of the valve.

10. A method of controlling a flow of fluid through a space isolation valve, the method comprising:
providing a flap valve with a shutter and a pneumatic actuator that is integrated into the valve, said actuator comprising a metal bellow directly welded first onto an intermediate flange connecting two valve bodies and secondly onto an end part of the shutter, said valve comprising guide means located inside the shutter and inside the bellow; and
pressuring said bellow when it is desired to open said flap valve.

11. The method of claim 10, wherein said method is performed at a high or cryogenic temperature.

12. A flap valve with a shutter and a pneumatic actuator integrated into the valve, said actuator comprising a metal bellow directly welded first onto an intermediate flange connecting two valve bodies and secondly onto an end part of the shutter, said end part cooperating with the intermediate flange and the bellow in order to create a chamber intended for the circulation of the control fluid under pressure that is perfectly tight relative to the outflow duct of the valve, wherein the chamber to be pressurized is outside the bellow.

* * * * *